United States Patent [19]

Biggs et al.

[11] Patent Number: 5,639,324

[45] Date of Patent: Jun. 17, 1997

[54] METHOD OF MAKING LAMINATED REINFORCED THERMOPLASTIC SHEETS AND ARTICLES MADE THEREFROM

[75] Inventors: Ian Stedman Biggs; Bronislaw Radvan, both of Buckinghamshire, England

[73] Assignee: The Wiggins Teape Group Limited, Basingstoke, England

[21] Appl. No.: 546,858

[22] Filed: Jul. 2, 1990

Related U.S. Application Data

[63] Continuation of Ser. No. 217,324, Jul. 11, 1988, Pat. No. 4,957,805, which is a continuation-in-part of Ser. No. 78,112, Jul. 27, 1987, abandoned.

[30] Foreign Application Priority Data

Jul. 31, 1986 [GB] United Kingdom ............... 86 18727

[51] Int. Cl.$^6$ ............... B32B 5/14; B32B 5/26; B32B 5/28; B32B 31/26
[52] U.S. Cl. ............... 156/83; 156/77; 156/62.8; 156/292; 156/296; 428/299
[58] Field of Search ............... 156/77, 83, 91, 156/308.2, 292, 309.9, 62.8, 309.6, 296; 428/223, 299, 301, 303, 316.6

[56] References Cited

U.S. PATENT DOCUMENTS

| 1,875,018 | 8/1932 | Kliefoth | 162/171 |
|---|---|---|---|
| 1,901,382 | 3/1933 | Stevenson | 162/165 |
| 2,388,187 | 10/1945 | Sall" | 162/145 |

(List continued on next page.)

FOREIGN PATENT DOCUMENTS

| 230504 | 1/1958 | Australia . |
|---|---|---|
| 559853 | 7/1983 | Australia . |
| 0071219 | 2/1983 | European Pat. Off. . |
| 0148763 | 7/1985 | European Pat. Off. . |
| 0148760 | 7/1985 | European Pat. Off. . |
| 0152994 | 8/1985 | European Pat. Off. . |
| 0173382 | 3/1986 | European Pat. Off. . |
| 1040359 | 10/1953 | France . |
| 1553537 | 2/1967 | France . |
| 1529133 | 6/1968 | France . |
| 2083560 | 12/1971 | France . |
| 2289338 | 5/1976 | France . |
| 2475970 | 8/1981 | France . |
| 24181Q | 1/1963 | Germany . |
| 3420195 | 12/1985 | Germany . |
| 56-37373 | 4/1981 | Japan . |
| 58-104719 | 6/1983 | Japan . |
| 462024 | 10/1968 | Switzerland . |
| 448138 | 6/1936 | United Kingdom . |

(List continued on next page.)

OTHER PUBLICATIONS

1004 Abstracts Bulletin of the Institute of Paper Chemistry, vol. 53 (1982) Aug. No. 2 Appleton, Wisconsin, USA.
"Polymer Processing", James M. McKelvey, 1962.
"Fibre Foam", Turner & Cogswell, 1976, presented at VIIth International Congress on Rheology in Sweden, Aug. 23 –Aug. 27, 1976.
"Paints and varnishes –Determination of flow time by use of flow cups", International Standard ISO 2431, 1984.
"Part A6. Determination of flow time by use of flow cups", British Standards Institution, 1984.
Kunstsoffe, vol. 75, No. 8, Aug. 1985, pp. 497–503.

Primary Examiner—Michael W. Ball
Assistant Examiner—Francis J. Lorin
Attorney, Agent, or Firm—Burns, Doane, Swecker & Mathis, L.L.P.

[57] ABSTRACT

Laminated reinforced thermoplastic sheets are made by preparing first and second porous sheets, each having 20% to 60% by weight of reinforcing fibers having a high modulus of elasticity and 40% to 80% by weight of a thermoplastic material differing from the thermoplastic material in the other sheet and applying heat and pressure to cause the sheets to consolidate and adhere together to form the laminate.

13 Claims, 2 Drawing Sheets

U.S. PATENT DOCUMENTS

| | | | |
|---|---|---|---|
| 2,653,870 | 9/1953 | Kast | 162/148 |
| 2,715,755 | 8/1955 | Jones | 264/518 |
| 2,795,524 | 6/1957 | Rodman | 525/177 |
| 2,892,107 | 6/1959 | Williams et al. | 310/358 |
| 2,962,414 | 11/1960 | Arledter | 162/145 |
| 3,042,574 | 7/1962 | Hochberg | 156/286 |
| 3,200,181 | 8/1965 | Rudloff | 264/122 |
| 3,216,841 | 11/1965 | Thellmann | 106/208 |
| 3,274,046 | 9/1966 | Shannon et al. | 428/316.6 |
| 3,396,062 | 8/1968 | White | 156/245 |
| 3,428,518 | 2/1969 | Schafer | 428/378 |
| 3,452,128 | 6/1969 | Rains | 264/126 |
| 3,489,827 | 1/1970 | Mueller et al. | 264/50 |
| 3,494,824 | 2/1970 | Roberts | 162/152 |
| 3,573,158 | 3/1971 | Pall et al. | 162/131 |
| 3,607,500 | 9/1971 | Field | 264/119 |
| 3,621,092 | 11/1971 | Hofer | 264/322 |
| 3,734,985 | 5/1973 | Greenberg | 264/45.3 |
| 3,832,115 | 8/1974 | Ettel | 425/373 |
| 3,837,986 | 9/1974 | Görter et al. | 425/582 |
| 3,850,723 | 11/1974 | Ackley | 156/180 |
| 3,856,614 | 12/1974 | Suzuki et al. | 428/316.6 |
| 3,865,661 | 2/1975 | Hata et al. | 156/79 |
| 3,873,336 | 3/1975 | Lambert et al. | 106/464 |
| 3,891,738 | 6/1975 | Shen | 264/101 |
| 3,897,533 | 7/1975 | Hani et al. | 264/137 |
| 3,903,343 | 9/1975 | Pfaff | 428/168 |
| 3,930,917 | 1/1976 | Esakov et al. | 156/78 |
| 3,975,483 | 8/1976 | Rudloff | 264/137 |
| 3,980,511 | 9/1976 | Proucelle | 156/62.4 |
| 3,980,613 | 9/1976 | Bachot et al. | 264/45.3 |
| 4,007,083 | 2/1977 | Ring et al. | 162/101 |
| 4,044,188 | 8/1977 | Segal | 428/283 |
| 4,081,318 | 3/1978 | Wietsma | 162/157.3 |
| 4,081,582 | 3/1978 | Butterworth et al. | 156/62.8 |
| 4,104,340 | 8/1978 | Ward | 264/6 |
| 4,104,435 | 8/1978 | Ballesteros | 428/288 |
| 4,153,760 | 5/1979 | Sundberg et al. | 429/252 |
| 4,159,294 | 6/1979 | Oishi et al. | 264/45.3 |
| 4,178,411 | 12/1979 | Cole et al. | 428/451 |
| 4,234,652 | 11/1980 | Vanoni et al. | 428/296 |
| 4,242,404 | 12/1980 | Bondoc et al. | 428/220 |
| 4,273,981 | 6/1981 | Nopper | 219/10.491 |
| 4,286,977 | 9/1981 | Klein | 55/524 |
| 4,327,164 | 4/1982 | Feinberg et al. | 429/144 |
| 4,339,490 | 7/1982 | Yoshioka et al. | 428/213 |
| 4,359,132 | 11/1982 | Parker et al. | 181/169 |
| 4,362,778 | 12/1982 | Andersson et al. | 428/240 |
| 4,386,943 | 6/1983 | Gümbel et al. | 51/298 |
| 4,393,154 | 7/1983 | Tyler et al. | 524/12 |
| 4,399,085 | 8/1983 | Belbin et al. | 264/41 |
| 4,426,470 | 1/1984 | Wessling et al. | 524/35 |
| 4,440,819 | 4/1984 | Rosser et al. | 428/107 |
| 4,451,539 | 5/1984 | Vallee et al. | 428/515 |
| 4,469,543 | 9/1984 | Segal et al. | 156/283 |
| 4,481,248 | 11/1984 | Fraige | 428/283 |
| 4,495,238 | 1/1985 | Adiletta | 428/215 |
| 4,498,957 | 2/1985 | Sasaki et al. | 162/146 |
| 4,503,116 | 3/1985 | Lapidus | 428/286 |
| 4,508,777 | 4/1985 | Yamamoto et al. | 428/280 |
| 4,512,836 | 4/1985 | Tucci | 156/174 |
| 4,528,051 | 7/1985 | Heinze et al. | 428/223 |
| 4,543,288 | 9/1985 | Radvan et al. | 428/297 |
| 4,555,426 | 11/1985 | Roth et al. | 428/113 |
| 4,562,033 | 12/1985 | Johnson et al. | 264/510 |
| 4,568,581 | 2/1986 | Peoples, Jr. | 428/36.1 |
| 4,595,617 | 6/1986 | Bogdany | 428/95 |
| 4,643,940 | 2/1987 | Shaw et al. | 428/308.4 |
| 4,649,014 | 3/1987 | Tochikawa | 264/555 |
| 4,659,528 | 4/1987 | Plowman et al. | 264/49 |
| 4,670,331 | 6/1987 | Radvan et al. | 428/303 |
| 4,690,860 | 9/1987 | Radvan et al. | 428/290 |
| 4,719,039 | 1/1988 | Leonardi | 252/511 |
| 4,734,321 | 3/1988 | Radvan et al. | 428/283 |
| 4,882,114 | 11/1989 | Radvan et al. | 264/129 |
| B1 4,543,288 | 1/1988 | Radvan et al. | 428/297 |

FOREIGN PATENT DOCUMENTS

| | | |
|---|---|---|
| 703023 | 1/1954 | United Kingdom . |
| 729381 | 5/1955 | United Kingdom . |
| 843154 | 8/1960 | United Kingdom . |
| 855132 | 11/1960 | United Kingdom . |
| 871117 | 6/1961 | United Kingdom . |
| 1008833 | 11/1965 | United Kingdom . |
| 1058932 | 2/1967 | United Kingdom . |
| 1110659 | 4/1968 | United Kingdom . |
| 1113792 | 5/1968 | United Kingdom . |
| 1129757 | 10/1968 | United Kingdom . |
| 1134785 | 11/1968 | United Kingdom . |
| 1133606 | 11/1968 | United Kingdom . |
| 1198324 | 7/1970 | United Kingdom . |
| 1204039 | 9/1970 | United Kingdom . |
| 1231937 | 5/1971 | United Kingdom . |
| 1230789 | 5/1971 | United Kingdom . |
| 1263812 | 2/1972 | United Kingdom . |
| 1306145 | 2/1973 | United Kingdom . |
| 1305982 | 2/1973 | United Kingdom . |
| 1330485 | 9/1973 | United Kingdom . |
| 1329409 | 9/1973 | United Kingdom . |
| 1348896 | 3/1974 | United Kingdom . |
| 1353477 | 5/1974 | United Kingdom . |
| 1373782 | 11/1974 | United Kingdom . |
| 1412642 | 11/1975 | United Kingdom . |
| 1424682 | 2/1976 | United Kingdom . |
| 1519310 | 7/1978 | United Kingdom . |
| 2051170 | 1/1981 | United Kingdom . |
| 2065016 | 6/1981 | United Kingdom . |
| 2093474 | 9/1982 | United Kingdom . |
| 2096195 | 10/1982 | United Kingdom . |
| 2147850 | 5/1985 | United Kingdom . |

METHOD OF MAKING LAMINATED REINFORCED THERMOPLASTIC SHEETS AND ARTICLES MADE THEREFROM

CROSS REFERENCE TO RELATED APPLICATION

This application is a continuation of application Ser. No. 07/217,324 filed Jul. 11, 1988, now U.S. Pat. No. 4,957,805, which is a continuation in part of U.S. patent application Ser. No. 07/708,112, filed on Jul. 27, 1987, now abandoned.

BACKGROUND OF THE INVENTION

This invention relates to a method of making reinforced thermoplastic laminates from thermoplastic sheets which may be different or incompatible, and to articles made therefrom.

In the Applicants' European Patent Application No. 85300032.1 (Publication No. 0 148 761) a method of making fibre reinforced plastics material sheet is described. It has been found that sheets of this type embodying different kinds of thermoplastic material are difficult to laminate if they have been first consolidated. It has now been discovered however that it is possible to make such a laminate if the starting sheets are unconsolidated as described in European Patent Application No. 85300031.3 (Publication No. 0 148 760) or have been expanded from a consolidated state as described in the Applicants' European Patent Application No. 85300034.7 (Publication No. 0 148 763). The subject matter disclosed in the above three European Patent Applications is incorporated by reference herein.

SUMMARY OF THE INVENTION

According to the present invention therefore a method of making laminated reinforced thermoplastic sheets includes preparing first and second porous sheets each comprising 20% to 60% by weight of reinforcing fibers having a high modulus of elasticity as herein defined, and 40% to 80% by weight of a thermoplastics material differing from the thermoplastic material in the other sheet, and applying heat and pressure to cause the sheets to consolidate and adhere together to form a laminate. The porosity content of the sheet may be inherent in the unconsolidated state of the starting sheet or be generated by expanding a consolidated sheet.

Preferably a substantial proportion of the fibers are between 7 and 50 millimeters long and 13 microns or less in diameter. Conveniently, the fibers are also in the form of single discrete glass fibers. Such fibers are usually provided bonded together into chopped strand bundles and these must be broken down into single fibers before the sheet is formed.

Where the fibers are required to confer structural strength in the laminate, the discrete glass fibers should not be shorter than about 7 millimeters or of a diameter greater than 13 microns, since such fibers which are longer do not adequately reinforce the plastics matrix and fibers which are of greater diameter do not efficiently reinforce the matrix. Single fibers of other materials having a reinforcement efficiency at least as high as glass fibers may, alternatively, be used.

A high modulus of elasticity is to be taken as meaning a modulus of elasticity substantially higher than that of the sheet. Fibers falling into this category include glass, carbon and ceramic fibers and fibers such as the aramid fibers sold under the trade names Kevlar and Nomex and will generally include any fibre having a modulus higher than 10,000 Mega Pascals.

As mentioned above the sheets may be first consolidated and then expanded by the application of heat prior to laminating.

In an alternative method the unconsolidated sheets can be formed and dried together prior to laminating.

The thermoplastic materials may for example be of polyethylene, polypropylene, polystyrene, acrylonitrile-styrenebutadiene, polyethyleneterephthalate, polybutylene-terephthalate or polyvinylchloride, both plasticized and unplasticized or alloys or blends of these materials with each other or other polymeric materials. Other suitable thermoplastics include polyphenylene ether or polycarbonates or polyestercarbonates or thermoplastic polyesters or polyetherimides or acrylonitrile—butylacrylate—styrene polymers or amorphous nylon or polyarylene ether ketone or alloys or blends of these materials with each other or other polymeric materials.

BRIEF DESCRIPTION OF THE DRAWINGS

The invention can be performed in many ways and some embodiments will now be described by way of example and with reference to the accompanying drawings in which.

DETAILED DESCRIPTION OF THE PREFERRED EMBODIMENTS

Figure 1:
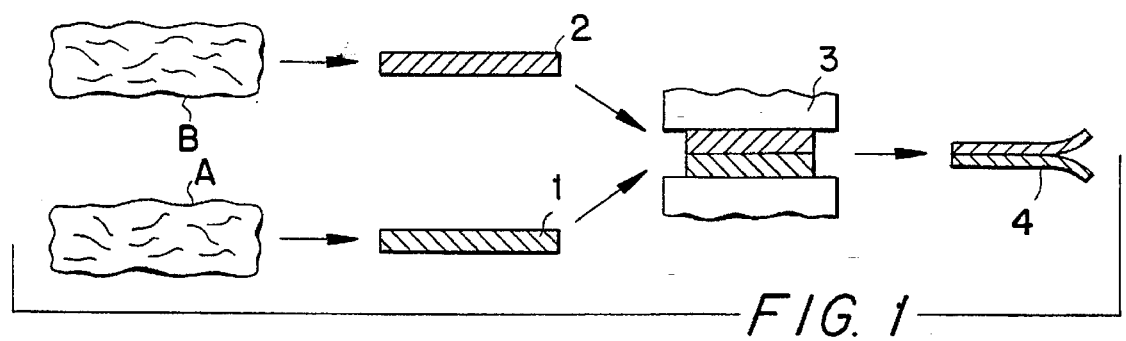
FIG. 1 shows a method of joining sheets into a laminate which only provides very poor adhesion.

In the following examples porous sheets A and B were made to a total weight of 2,000 $g/m^2$ each according to the method set forth in European Patent Application No. 2.1 (Publication No. 0 148 761), each sheet containing by weight of glass fibers (11 μm diameter, by 13 mm long) but dispersed in a different thermoplastic. Sheet A, as shown in the drawings, was made with polypropylene, grade GY545M, made by I. C. I. Limited, and Sheet B was made with XENOY, a thermoplastic alloy of polycarbonate and polybutyleneterephthalate made by G. E. Plastics Inc.

Laminates were made up in four different ways as shown in the accompanying drawings. The adhesion between the plies was assessed subjectively by cutting a strip 15 mm wide by 200 mm long, and twisting its ends in the opposite directions, until either delamination, or a transverse break occurred.

EXAMPLE 1 (control)

As shown in FIG. 1, unconsolidated dry sheets A and B made as described in European Patent Application No. 85300031.3 (Publication No. 0 148 760), were individually hot pressed respectively at 190° C. and 260° C. and cooled to produce cold consolidated sheets 1 and 2. The cold consolidated sheets A and B were then hot pressed together in a press 3 at 200 lbs per sq. inch, the temperatures of the press platens in contact with the sheets being respectively 170° C. and 250° C. The resulting laminate 4 was cooled and when tested was found to have very poor adhesion between the component sheets.

EXAMPLE 2

Figure 2:
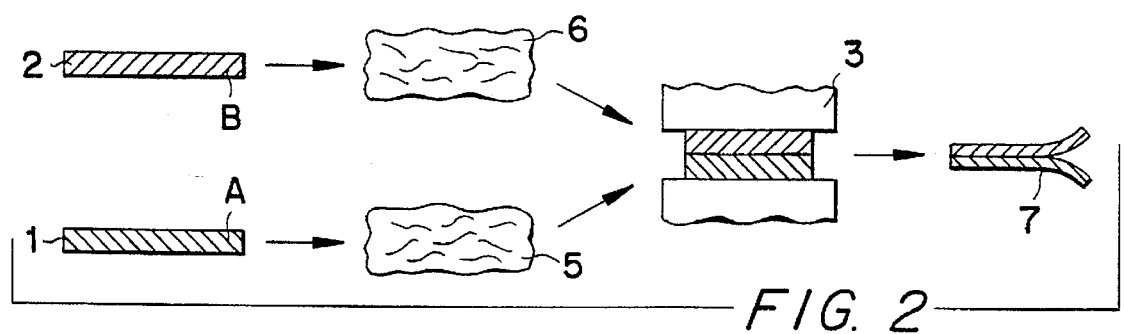
FIG. 2 shows a method of producing a laminate according to the present invention.

As shown in FIG. 2, the sheets A and B which had previously been consolidated, were heated and expanded in the manner described in European Patent Application No. 85300034.7 (Publication No. 0 148 763) so that they became permeable as indicated by reference numerals 5 and 6. The expanded sheets were placed together in a press 3 where they were subjected to a pressure of 200 lbs per sq. inch at a temperature of 90° C. The resulting laminate was cooled and the adhesion between the component sheets was found to be better than in the method described with regard to FIG. 1.

EXAMPLE 3

Figure 3:
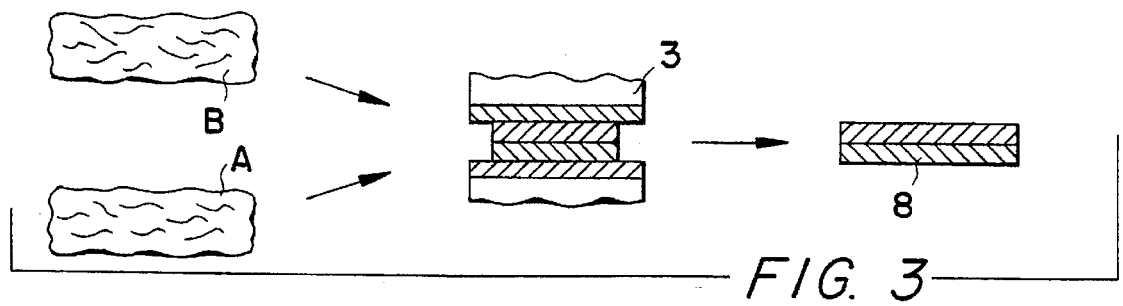
FIG. 3 shows an alternative method.

As shown in FIG. 3, unconsolidated sheets A and B of the kind used at the start of Example 1 were placed together in press 3 where they were subjected to a pressure of 200 lbs per sq. inch with the press platens at a temperature of 170° C. and 250° C. respectively. The resulting laminate was allowed to cool and it was found that there was very good adhesion between the component sheets.

EXAMPLE 4

Figure 4:
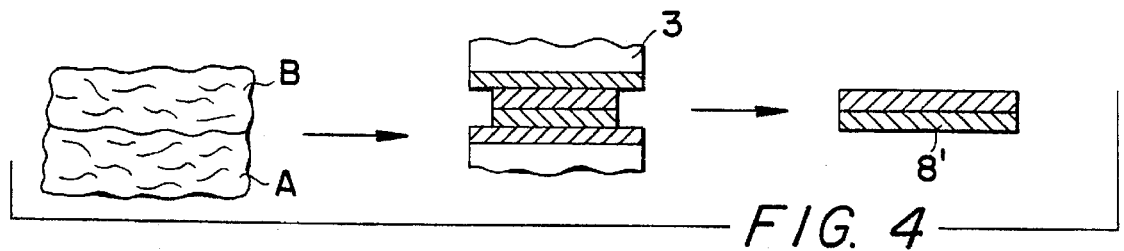
FIG. 4 shows another alternative method.

As shown in FIG. 4, unconsolidated dry sheets A and B of the kind used in Example 1, were formed and dried together prior to being placed in the hot press, where they were subjected to the same treatment as in Example 3. Very good adhesion between the component sheets was achieved.

EXAMPLE 5

Figure 5:
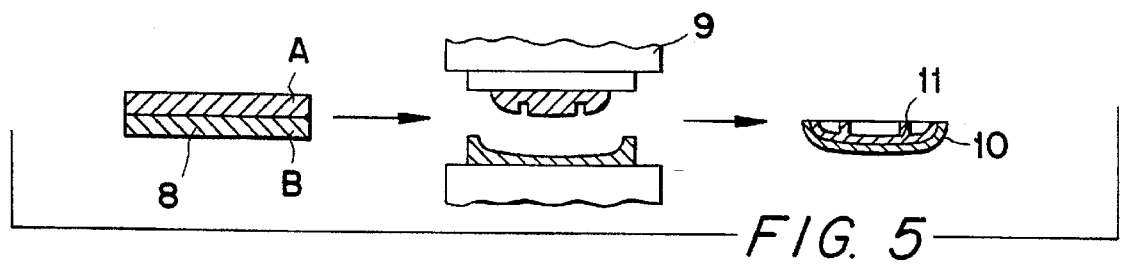
FIG. 5 shows a method of manufacturing an article utilizing the laminate made according to the invention.

FIG. 5 shows a method of manufacturing an article out of a laminate 8 made according to the method of Example 3. The laminate 8 is placed in a suitable heated forming tool 9 in a press 10, the two platens of which are heated at 90° C., and subjected to a pressure of 200 lbs per sq. inch to produce a molded article 11.

Depending upon the materials used, the finish of the laminate or molding can be varied. Thus, if the sheet A has a relatively low glass fibre content, of for example 25%, the lower surface 12 of the manufactured article will be formed with a fairly smooth finish. On the other hand, a high glass fibre content, of for example 60%, will result in a porous surface providing a key for a surfacing layer subsequently applied.

The invention therefore provides a technique for producing a molded article from a laminate which may, for example, use a heat resisting ply on one side and an easily moldable ply on the other made from a cheaper thermoplastic. It will be appreciated that the invention also extends to the formation of laminates having more than two plies. For example, a three ply laminate could be provided having a core layer of fibre reinforced polypropylene and surfacing layers of fibre reinforced nylon.

In the following Examples a 22 centimeter diameter disc of a glass mat/polypropylene laminate having a weight of 4000 grams per sq. meter and a glass fibre content of 40%, sold under the trade name AZDEL, was heated to 205° C. for seven and a half minutes in an oven and laminated in a dish shaped mould at 2000 pounds per sq. inch to the material specified.

EXAMPLE 6

The second component of the laminate comprised a porous unconsolidated sheet like material having a weight of 3000 grams per sq. meter and made as described in European Patent Application No. 85300031.3 (Publication No. 0 148 760) from 30% glass fibers 12 millimeters long and 11 microns in diameter and 70% Nylon 6 powder sold under the trade name MARANYL 236R by ICI Ltd. The resulting laminate when cooled exhibited good adhesion between the plies.

EXAMPLE 7

The second component of the laminate was essentially the same as that of Example 6, except that the thermoplastic content comprised 70% of a thermoplastic alloy of polycarbonate and polybutyleneterephthalate sold under the trade mark VALOX by G. E. Plastics Inc. The resulting laminate, when cooled, exhibited good adhesion between the plies.

As presently understood, the improved adhesion between the plies of the laminate can be explained in the following manner. With respect to the situation pertaining in Example 1, each of the cold consolidated sheets 1, 2 has a substantially smooth surface, essentially free of projecting reinforcing fibers. When those cold consolidated sheets 1, 2 are subjected to the hot press, there is essentially face-to-face contact between the consolidated sheets. Thus, after the pressure of the press is released and the laminated structure is allowed to cool, adhesion between the two faces of the sheets provides the only mechanism to resist delamination.

Turning now to the situation of Example 2, the previously consolidated sheets 1, 2 are heated and allowed to expand, releasing stresses in the reinforcing fibers that had been wetted by the thermoplastic material and resulting in a porous structure. Next, the expanded sheets 5, 6 are subjected to a cool pressing operation. Stated differently, in the process of Example 2, the hot pressing step of Example 1 is split into two separate steps: (a) heating, followed by (b) pressing.

Figure 6:
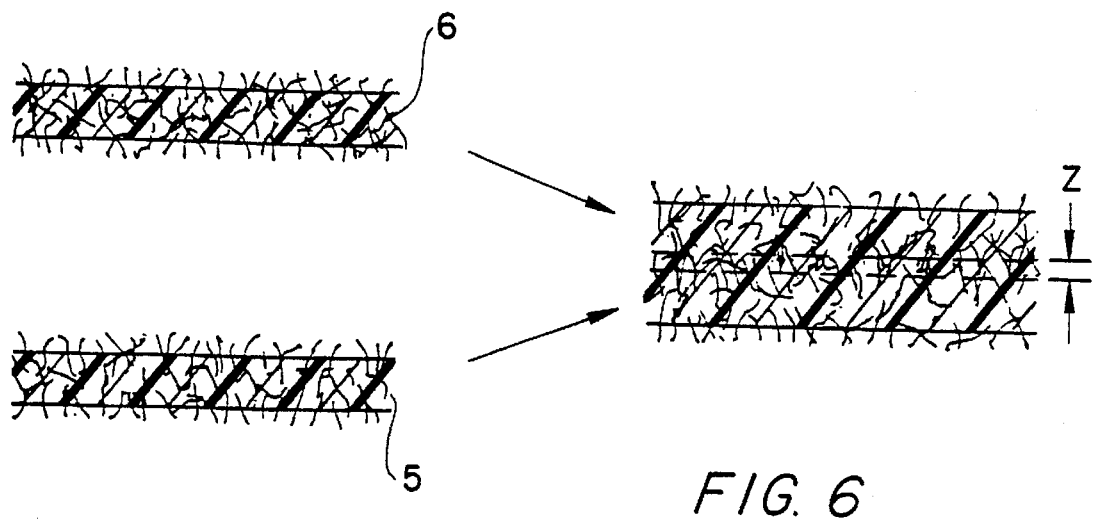
FIG. 6 is an enlarged schematic view of the of the expanded sheets of FIG. 2 and their relationship to one another just prior to the application of pressure.

Following the heating step, reinforcing fibers project from the surfaces of the expanded sheets 5, 6 (see FIG. 6) with essentially random orientations relative to the surface and can be considered to define a pile or nap on the surface of the respective sheets. When these expanded sheets 5, 6 are placed in contact with one another (see the right side of FIG. 6) the piles of the two facing surfaces interengage in a boundary zone, Z, between the two sheets.

With the application of pressure during the pressing step, projecting fibers from each sheet interact with the structure in one or more of the following ways: projecting fibers of one sheet move into the thermoplastic material of the other sheet; projecting fibers of one sheet interengage with projecting fibers from the other sheet in the boundary zone, Z; and projecting fibers of the sheet are bonded to the thermoplastic material of either or both sheets. Accordingly, in the boundary zone, Z, between the sheets being laminated, delamination is resisted by two mechanisms: (i) trapping of fibers projecting from the opposed surfaces in the solidified plastics material in the zone Z; and (ii) mechanical interaction between interengaging solidified filaments of the two thermoplastics extending through the boundary zone, Z. As a result of these two mechanisms, the laminate resulting from the process of Example 2 has an improved resistance to delamination in comparison to the laminate resulting from the process of Example 1, as previously noted.

Turning now to the process of Example 3, the starting materials are unconsolidated sheets A, B, of thermoplastic materials. Such sheets are typically an intertwined network of fibers having particles of thermoplastic material bonded to the fibers and retained in the fiber network. The fibers are essentially unstressed and project randomly from the surfaces of the sheet.

Figure 7:
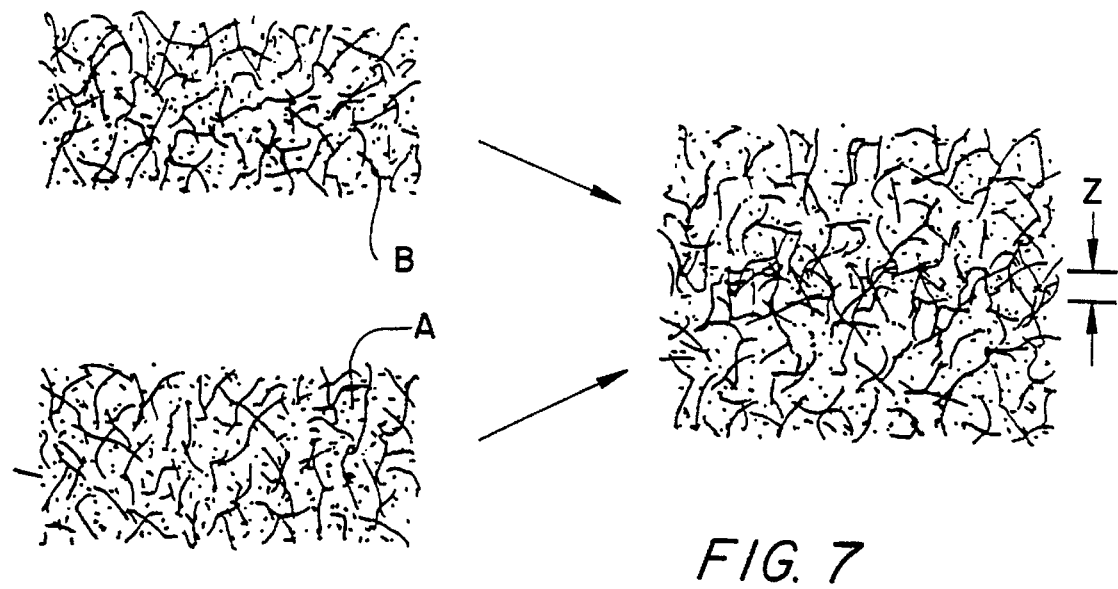
FIG. 7 is an enlarged schematic view of the unconsolidated sheets of FIG. 3 and their relationship to one another just prior to the application of pressure.

When these unconsolidated sheets A, B, are placed together at the beginning of the hot pressing step (see right side of FIG. 7), a boundary zone, Z, is also formed. However, in contrast to the boundary zone of FIG. 6, the boundary zone of FIG. 7 is considerably greater in thickness than that of Example 2. This greater thickness results from the greater openness of the unconsolidated sheets and the consequent ease with which the stiff fibers of one sheet can project into the relatively open network of the other sheet. The mechanism of adhesion is exactly the same as in Example 2. The adhesion is better simply because the boundary zone is thicker and there is therefore more material to interlock.

Now, when the hot pressing step is performed, the particulate thermoplastic materials of each sheet flow into the interstices between the compressed network of fibers in both sheets as well as in the boundary zone. Due to the presence of both kinds of particulate thermoplastic material in the boundary zone, the interface between the thermoplastic materials of the two sheets is not planar, but is highly irregular. Thus, to the extent that the two thermoplastic materials are not soluble in one another, or mixable, the thermoplastic materials themselves establish an interlocked relationship at their interface. In combination with this complex thermoplastic material interface, the reinforcing fibers in the boundary zone themselves have the mechanical interaction which was described above. As a result, the laminate of the process of Example 3 has an even better resistance to delamination than does the laminate of Example 2.

As an alternative to the process of making two separate unconsolidated sheets to be used in this invention, it is possible to form and dry together the two different unconsolidated sheets. As the exemplary references to the European patent applications show, unconsolidated sheets for use with this invention can be made on paper making machinery where a stock containing particulate thermoplastic and reinforcing fibers is drained on the wire of a Fourdrinier paper making machine. It is, therefore, possible to use a suitable conventional paper making machine to deposit on the Fourdrinier wire a first stock, which is partially drained, and to then deposit a second stock on top of the partially drained first stock. The second stock may have reinforcing fibers and a second thermoplastic material. As the two stocks progress through the machine, they are further drained and then they are dried together in the dryer portions of the machine. Accordingly, the resulting sheets has a layer of reinforcing fibers with a first particulate thermoplastic material and a layer of reinforcing fibers with a second particulate thermoplastic material which are thus formed together and dried together. Such a product also gives good resistance to delamination when hot pressed.

It is possible to form the unconsolidated two layer structure on a conventional twin wire paper machine, with each layer being first laid down on separate Fourdrinier wires, two layers being married together then passed through final drain stages to make a single structure.

Consolidated structures comprising more than two layers are also within the scope of the invention. Thus, permitting the formation of complex reinforced laminates in the various layers each of which comprise a different thermoplastic. Such multi-layer structures may be formed using multiple head boxes or a multilayer head box on a single Fourdrinier wire or a combination of a multiple wire paper machine in which one or more head boxes are provided on each wire. A paper machine of the kind disclosed in European Patent Publication No. 233 058, for example, may be used for forming such multilayer structures.

It should now be apparent that there has been described a method of making laminated reinforced thermoplastic sheets which overcomes problems of the type associated with the prior art. Moreover, it will be apparent to those skilled in the art that numerous modifications, variations, substitutions, and equivalents exist for various aspects of the invention. Accordingly, it is expressly intended that all such modifications, variations, substitutions, and equivalents for features of the invention which fall within the spirit and scope of the invention, as defined by the appended claims, be embraced thereby.

What is claimed is:

1. A method of making laminated reinforced thermoplastic sheets which consists essentially of preparing first and second porous sheets each comprising 20% to 60% by weight of reinforcing fibers having a high modulus of elasticity and 40% to 80% by weight of a thermoplastics material wherein the thermoplastic material in the first sheet is different from the thermoplastic material in the second sheet, placing the sheets together so that projecting fibers from the adjacent sheets interengage in a boundary zone, and applying heat and pressure to cause the sheets to consolidate and adhere together to form a laminate.

2. A method of making a laminated reinforced thermoplastic sheet with improved resistance to delamination which consists essentially of the steps of preparing a first porous sheet comprising 20% to 60% by weight of reinforcing fibers having a high modulus of elasticity and 40% to 80% by weight of a first thermoplastics material, preparing a second porous sheet comprising 20% to 60% by weight of reinforcing fibers having a high modulus of elasticity and 40% to 80% by weight of a second thermoplastics material differing from the first thermoplastic material, placing the sheets together so that projecting fibers from the adjacent sheets interengage in a boundary zone, and applying heat and pressure to cause the sheets to consolidate and adhere together to form a laminate.

3. A method of making a laminated reinforced thermoplastic sheet with improved resistance to delamination which comprises the steps of preparing a first porous sheet comprising 20% to 60% by weight of reinforcing fibers having a high modulus of elasticity and 40% to 80% by weight of a first thermoplastics material, preparing a second porous sheet comprising 20% to 60% by weight of reinforcing fibers having a high modulus of elasticity and 40% to 80% by weight of a second thermoplastics material differing from the first thermoplastic material, placing the sheets together so that projecting fibers from the adjacent sheets interengage in a boundary zone, and applying heat and pressure to cause the sheets to consolidate and adhere together to form a laminate.

4. A method as claimed in claim 3 in which at least one sheet is unconsolidated when the pressure is released.

5. A method as claimed in claim 3 in which at least one sheet is expanded after consolidation.

6. A method as claimed in claim 3 in which a substantial proportion of the fibers are between 7 and 50 millimeters long and 13 microns or less in diameter.

7. A method as claimed in claim 3 in which the fibers are in the form of single discrete glass fibers.

8. A method as claimed in claim 7 in which the discrete glass fibers are not shorter than about 7 millimeters or of a diameter greater than 13 microns.

9. A method as claimed in claim 3 in which the sheets are first consolidated, then expanded by the application of heat prior to laminating.

10. A method as claimed in claim 3 in which the thermoplastic materials are polyethylene, polypropylene, polystyrene, acrylonitrilestyrenebutadiene, polyethyleneterephthalate, polybutyleneterephthalate, or polyvinylchloride, both plasticized and unplasticized or alloys or blends of these materials with each other or other polymeric materials.

11. A method as claimed in claim 3 in which the thermoplastic materials are polyphenylene ether or polycarbonates or polyestercarbonates or thermoplastic polyesters or polyetherimides or acrylonitrile—butylacrylate—styrene polymers or amorphous nylon or polyarylene ether ketone or alloys or blends of these materials with each other or other polymeric materials.

12. An article made according to the method of claim 11.

13. An article made from laminated sheets as set forth in claim 3 which has been made by heating and molding the laminated sheets.

* * * * *